United States Patent
Nishino (10) Patent No.: US 6,277,049 B1
(45) Date of Patent: *Aug. 21, 2001

(54) SHIFT CONTROL SYSTEM RESPONSIVE TO LOW OIL TEMPERATURE

(75) Inventor: Kenji Nishino, Kanagawa (JP)

(73) Assignee: Nissan Motor Co., Ltd., Yokohama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/268,995

(22) Filed: Mar. 16, 1999

(30) Foreign Application Priority Data

Mar. 23, 1998 (JP) .................................................. 10-07389

(51) Int. Cl.[7] .............................. F16H 61/08; F16H 61/04
(52) U.S. Cl. ............................. 477/98; 477/143; 477/156
(58) Field of Search ................................. 477/97, 98, 156, 477/143

(56) References Cited

U.S. PATENT DOCUMENTS

| | | | |
|---|---|---|---|
| 5,558,597 | * 9/1996 | Oba et al. ............................... | 477/98 |
| 5,692,991 | * 12/1997 | Iwata et al. ............................ | 477/98 |
| 5,876,301 | * 3/1999 | Tabata et al. ........................ | 477/98 X |
| 5,947,856 | * 9/1999 | Tabata et al. ........................ | 477/98 X |
| 5,957,807 | * 9/1999 | Takamatsu et al. .................... | 477/98 |

FOREIGN PATENT DOCUMENTS

| | | |
|---|---|---|
| 8-233077 | 9/1996 | (JP) . |
| 409021459A | * 1/1997 | (JP) . |
| 9-21459 | 1/1997 | (JP) . |

OTHER PUBLICATIONS

English Language Translation of Document A1.
"A Service Manual of RE4R01A type Automatic Transmission (A261C07)", published by Nissan Motor Co., Ltd.; (1987).

* cited by examiner

Primary Examiner—Khoi Q. Ta
Assistant Examiner—Dirk Wright
(74) Attorney, Agent, or Firm—Foley & Lardner

(57) ABSTRACT

A shift control system executing a shift of an automatic transmission with a manual shift mode from a first speed position to a second speed position. A controller of the shift control system controls a first valve for varying a pressure applied to a first friction element and a second valve for varying a pressure applied to a second friction element. The controller delays an operation of the second valve as compared with an operation of the first valve when a transmission oil temperature is lower than a predetermined temperature.

10 Claims, 9 Drawing Sheets

| GEAR | FRICTION ELEMENT | | | | | |
|---|---|---|---|---|---|---|
| | F/C | H/C | B/B | LR/B | L/OWC | R/C |
| 1ST SPEED | ○ | × | × | (○) | ○ | × |
| 2ND SPEED | ○ | × | ○ | × | × | × |
| 3RD SPEED | ○ | ○ | × | × | × | × |
| 4TH SPEED | × | ○ | ○ | × | × | × |
| REVERSE | × | × | × | ○ | × | ○ |

SHIFT CONTROL SYSTEM RESPONSIVE TO LOW OIL TEMPERATURE

BACKGROUND OF THE INVENTION

The present invention relates to a shift control system for an automatic transmission, and more particularly to a shift control system arranged to prevent an automatic transmission from generating an interlock during a shift executed by an engagement of one friction element and a disengagement of another friction element under a low temperature condition.

An automatic transmission shown in "A Service Manual of RE4R01A type Automatic Transmission (A261C07)" published by Nissan Motor Co., Ltd. is arranged to execute a shift by engaging a friction element and by disengaging another friction element. The engagement of the friction element to be engaged is quickly executed even if a viscosity of hydraulic oil of the automatic transmission becomes high due to a low temperature because the pressurized hydraulic oil is supplied to the friction element to be engaged. In contrast, if the viscosity of the hydraulic oil is high under the low temperature condition, the disengagement of the friction element to be disengaged is delayed according to the increase of the viscosity of the hydraulic oil since the disengagement operation is executed by simply draining the hydraulic oil from the friction element to be disengaged. This time delay of the disengagement will degrade a shift feeling applied to a driver. A Japanese Patent Provisional Publication No. 8-233077 has proposed a shift control system arranged to forbid or disable a manual shift when a hydraulic oil temperature is low, in order to avoid a driver from feeling the degraded shift feeling of the manual shift under the low temperature condition.

SUMMARY OF THE INVENTION

However, a temporal interlock during shift in an automatic shift mode and a trouble due to the interlock under a low temperature will be not solved by the above-mentioned arrangement. Further, the forbidding or disabling of all of the shifts in the manual shift mode excessively decreases merits of an automatic transmission with a manual shift mode.

It is an object of the present invention to provide an improved shift control system which solves the problems caused under the low temperature condition even if the automatic transmission is set in the automatic shift mode.

A shift control system of an automatic transmission according to the present invention executes a shift from a first speed position to a second speed position. The shift control system with a manual shift mode comprises a first friction element, a one-way clutch, a second friction element, a first solenoid, a second solenoid, an oil temperature sensor, and a controller. The first friction element is engaged by pressure of hydraulic oil so as to put engine brake active when the first speed position is selected in the manual shift mode. The one-way clutch is engaged when the first position is selected in the automatic shift mode. The second friction element is engaged by pressure of hydraulic oil when the second speed position is selected in the manual shift mode or the automatic shift mode. The first solenoid varies a pressure of hydraulic oil applied to the first friction element according to a first signal. The second solenoid varies a pressure of the hydraulic oil applied to the second friction element according to a second signal. The oil temperature sensor detects a temperature of the hydraulic oil and outputs a temperature signal indicative of the temperature of the hydraulic oil. The controller outputs the first signal to the first solenoid to decrease the pressure of hydrulic oil and outputs the second signal to the second solenoid to engage the second friction element when the shift from the first shift position to the second shift position is executed in the manual shift mode. The controller delays the output of the second signal as compared with the output of the first signal when the temperature signal from the oil temperature sensor is lower than a predetermined temperature.

DETAILED DESCRIPTION OF THE INVENTION

Referring to FIGS. 1 to 8, there is shown an embodiment of a shift control system of an automatic transmission in accordance with the present invention.

Figure 1:
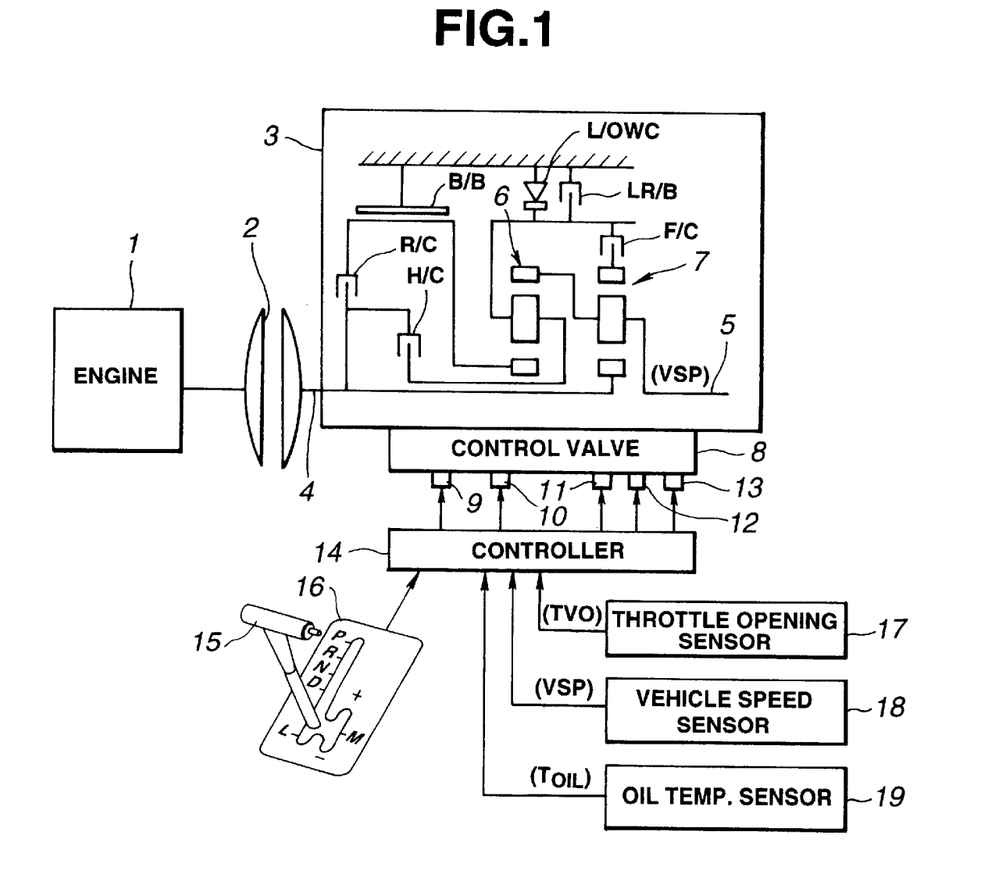
FIG. 1 is a schematic view showing an automatic transmission system provided with a shift control system of an embodiment according to the present invention.

As shown in FIG. 1, an internal combustion engine 1 is connected to an automatic transmission 3 through a torque converter 2, so that engine rotation power is transmitted from the internal combustion engine 1 to an input shaft 4 of the automatic transmission 3 through the torque converter 2. A basic mechanical construction of the automatic transmission 3 is similar to that of an automatic transmission shown in "A service manual of RE4R01A type automatic transmission (A261C07)" published by Nissan Motor Ltd, Co. That is, the input shaft 4 is coaxially and buttly arranged with an output shaft 5. A front planetary gear unit 6 and a rear planetary gear unit 7 are arranged around the input and output shafts 4 and 5.

Figure 2:
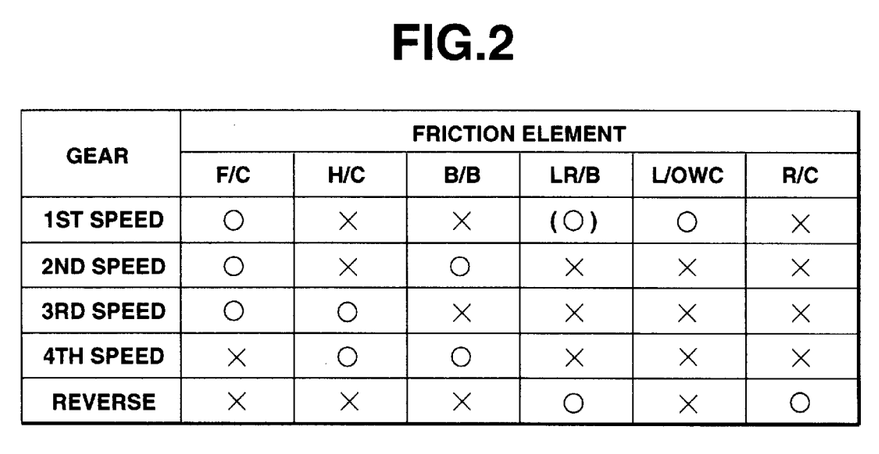
FIG. 2 is a table showing a friction element engagement pattern to establish various gear ratios of the automatic transmission system of FIG. 1.

The automatic transmission 3 comprises a forward clutch F/C, a high clutch H/C, a band brake B/B, a low reverse brake LR/B, a low one-way clutch L/OWC and a reverse clutch R/C, respectively functioning as a friction element. By selectively engaging these friction elements as shown in FIG. 2, the automatic transmission 3 selectively establishes forward first to fourth speeds and a reverse speed. In FIG. 2, a mark 0 shows an engaged state of the marked friction element, and a mark x shows a disengaged state of the marked friction element. A mark (0) regarding the low reverse brake LR/B shows to be engaged when an engine brake is required during the first speed. In other words, when a driver selects an engine brake range L, the low reverse brake LR/B is engaged.

In order to execute the selective engagement of the friction elements, the automatic transmission 3 comprises a control valve 8 which is provided with a duty solenoid 9 for the forward clutch F/C, a duty solenoid 10 for the high clutch H/C, a duty solenoid 11 for the band brake B/B, a duty solenoid 12 for the low reverse brake LR/B and a duty solenoid 13 for the reverse clutch R/C.

A controller 14 controls the duty solenoids 9 to 13 so as to duty-control the hydraulic pressures of the friction elements corresponding to the respective solenoid valves 9 to 13. By controlling the duty solenoids 9 to 13, the automatic transmission 3 realizes the engagement logic shown in FIG. 2. More particularly, the automatic transmission 3 selects one of the first to fourth speeds in an automatic shift mode and a manual shift mode (M-range) and a reverse speed in the automatic shift mode by controlling the duty solenoids 9 to 13 according to the logic in FIG. 2.

The controller 14 is connected to a selector switch 16, a throttle opening sensor 17, a vehicle speed sensor 18 and an oil temperature sensor 19. The selector switch 16 outputs a signal indicative of a selected range and a manual shift command selected by a driver through a shift lever 15 to the controller 14. The throttle opening sensor 17 outputs a signal indicative of the throttle opening TVO of the engine 1 to the controller 14. The vehicle speed sensor 18 outputs a signal indicative of a vehicle speed VSP to the controller 14. The oil temperature sensor 19 outputs a signal indicative of an oil temperature $T_{OIL}$ of transmission oil to the controller 14.

The shift lever 15 selectively takes a parking range (P-range), a reverse range (R-range), a neutral range (N-range), a forward automatic transmission range (D-range) and an engine brake range (L-range) which are aligned straight as an automatic shift mode. Further, the shift lever 15 takes a manual shift mode (M-range) which is offset from the straightly aligned the automatic ranges (P-range, R-range, N-range, D-range, and L-range) as shown in FIG. 1. The selector switch 16 is arranged to output the signal indicative of a range taken by the shift lever 15 to the controller 14. When the shift lever 15 is positioned in the M-range, the shift lever 15 is elastically returned to a position between an upshift position (+) and a downshift position (−). If the driver desires an upshift by one speed, the driver once tilts the shift lever 15 to the upshift position (+) in the M-range. On the other hand, if the driver desires a downshift by one speed, the driver once tilts the shift lever 15 to the downshift position (−) in the M-range. The selector switch 16 outputs the manual shift command indicative of the upshift or the downshift by each tilting of the shift lever 15 to the upshift position (+) or the downshift position (−).

The controller 14 executes the shift control of the automatic transmission 3 on the basis of the input information from the selector switch 16. The controller 14 executes the shift control in the P-range, R-range, N-range, D-range and L-range by controlling the engagements of the friction elements according to the engagement pattern of FIG. 2 through the duty control of the duty solenoids 9 to 13. The L-range of this embodiment corresponds to 1-range of the RE4R01A type automatic transmission.

An automatic shift in the D-range executed by the shift control system according to the present invention will be discussed hereinafter. The controller 14 retrieves a preferable gear ratio to be required at the present driving state, on the basis of a shift map stored in the controller 14 and from the throttle opening TVO and the vehicle speed VSP. Next, the controller 14 decides whether or not the present gear ratio is the same as the preferred gear ratio retrieved by the controller 14. When the controller 14 decides that the present gear ratio is not the same as the preferred gear ratio, the shift is executed to adjust the gear ratio at the preferred gear ratio. More particularly, the duty control of the duty solenoids 9 to 13 is executed so that the engagement and the disengagement of the friction elements of the automatic transmission 3 are executed on the basis of the engagement pattern table of FIG. 2. When the present gear ratio is the same as the preferred gear ratio retrieved by the controller 14, the controller 14 keeps the duty state of each of the duty solenoids 9 to 13 to maintain the present selected gear ratio. Next, the manual shift in the M-range of the shift control system according to the present invention will be discussed hereinafter.

The controller 14 receives the manual upshift command for each time when the shift lever 15 is tilted to the upshift position (+), and receives the manual downshift command for each time when the shift lever 15 is tilted to the downshift position (−). In response to the manual shift commands from the selector switch 16, the controller 14 executes the duty control of the duty solenoids 9 to 13 so that the engagement and the disengagement of the friction elements are executed on the basis of the engagement pattern table of FIG. 2 to change the present gear ratio to an upper or lower gear ratio. When the first-speed in the M-range is selected by the manual shift, the low reverse brake LR/B is engaged as shown by the mark (O) in FIG. 2 so as to put the engine brake in an active state. When the first-speed of the D-range is selected by the automatic shift, the low reverse brake LR/B is disengaged so as to put the engine brake in an inactive state. In contrast, when an engine brake range L of the automatic shift is selected, the low reverse brake LR/B is engaged.

Therefore, when the gear ratio is changed from the manual first-speed to the manual second-speed in the M-range (manual 1→2 shift), the shift is basically completed by disengaging the low reverse brake LR/B and by engaging the band brake B/B. On the other hand, when the gear ratio is changed from the automatic first speed to the automatic second speed (automatic 1→2 shift), the shift is completed by merely engaging the band brake B/B.

The shift control system according to the present invention is arranged to smoothly execute the manual 1→2 shift even under a low-temperature condition under that an interlock of the automatic transmission tends to cause if the manual 1→2 shift is executed by a conventional manner as mentioned in background of the invention.

Figure 3:
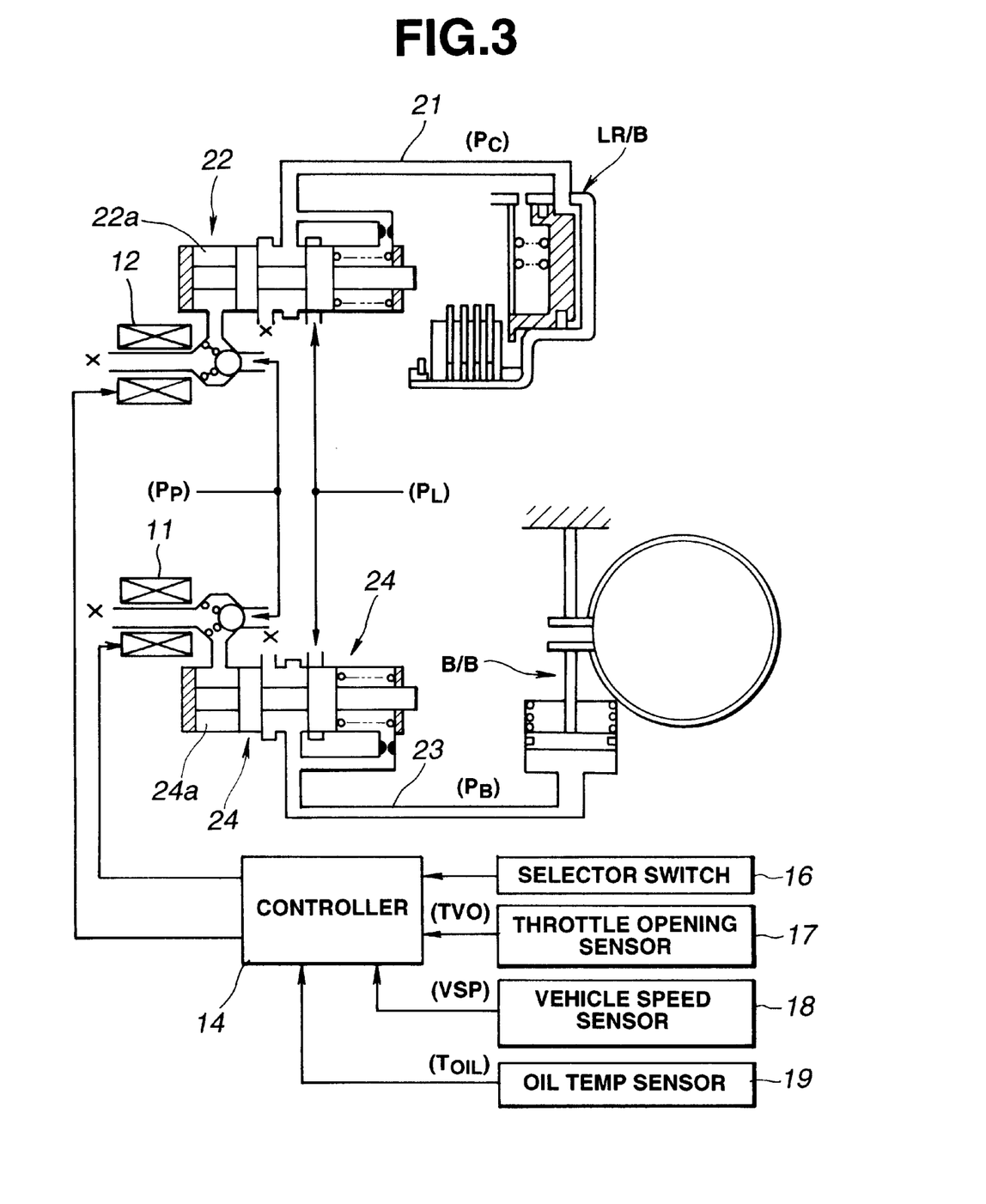
FIG. 3 is a partial system view showing the shift control system according to the present E invention.

FIG. 3 shows a shift control circuit relating to the low reverse brake LR/B and the band brake B/B. A pressure control valve 22 is inserted into a hydraulic pressure circuit 21 of the low reverse brake LR/B, and a pressure control valve 24 is inserted into a hydraulic pressure circuit 23 of the band brake B/B. The pressure control valve 22 receives the line pressure $P_L$ as a base pressure and raises the hydraulic pressure $P_C$ of the low reverse brake LR/B according to the increase of a control pressure in a chamber 22a of the pressure control valve 22. Similarly, the pressure control valve 24 receives the line pressure $P_L$ as a base pressure and raises the hydraulic pressure $P_B$ of the band brake B/B according to the increase of a control pressure in a chamber 24a of the pressure control valve 24.

The control pressure of each of the pressure control valves 22 and 24 is determined by each of the duty solenoids 12 and 11. The duty solenoid 12 receives a pilot pressure produced by decreasing the line lo pressure $P_L$ as a base pressure and supplies the control pressure modified according to the drive duty of the duty solenoids 12 to the chamber 22a and 24a. Similarly, the duty solenoid 11 receives a pilot pressure produced by decreasing the line pressure $P_L$ as a base pressure and supplies the control pressure modified according to the drive duty of the duty solenoids 11 to the chamber 24a.

When the drive duty to each of the duty solenoids 12 and 11 is 0%, each of the duty solenoids 12 and 11 does not supply the control pressure to each of the chambers 22a and 24a, so that each of the hydraulic pressure PC of the low reverse brake LR/B and the hydraulic pressure $P_B$ of the band brake B/B is set at 0 so as to disengage each of the low reverse brake LR/B and the band brake B/B. When the drive duty to each of the duty solenoids 12 and 11 is 100%, the control pressure to each of the chambers 22a and 24a is set at the maximum value as same as the pilot pressure PP, so 30 that each of the hydraulic pressure PC of the low reverse brake LR/B and the hydraulic pressure $P_B$ of the band brake B/B is set at the maximum value so as to engage each of the low reverse brake LR/B and the band brake B/B.

Figure 4:
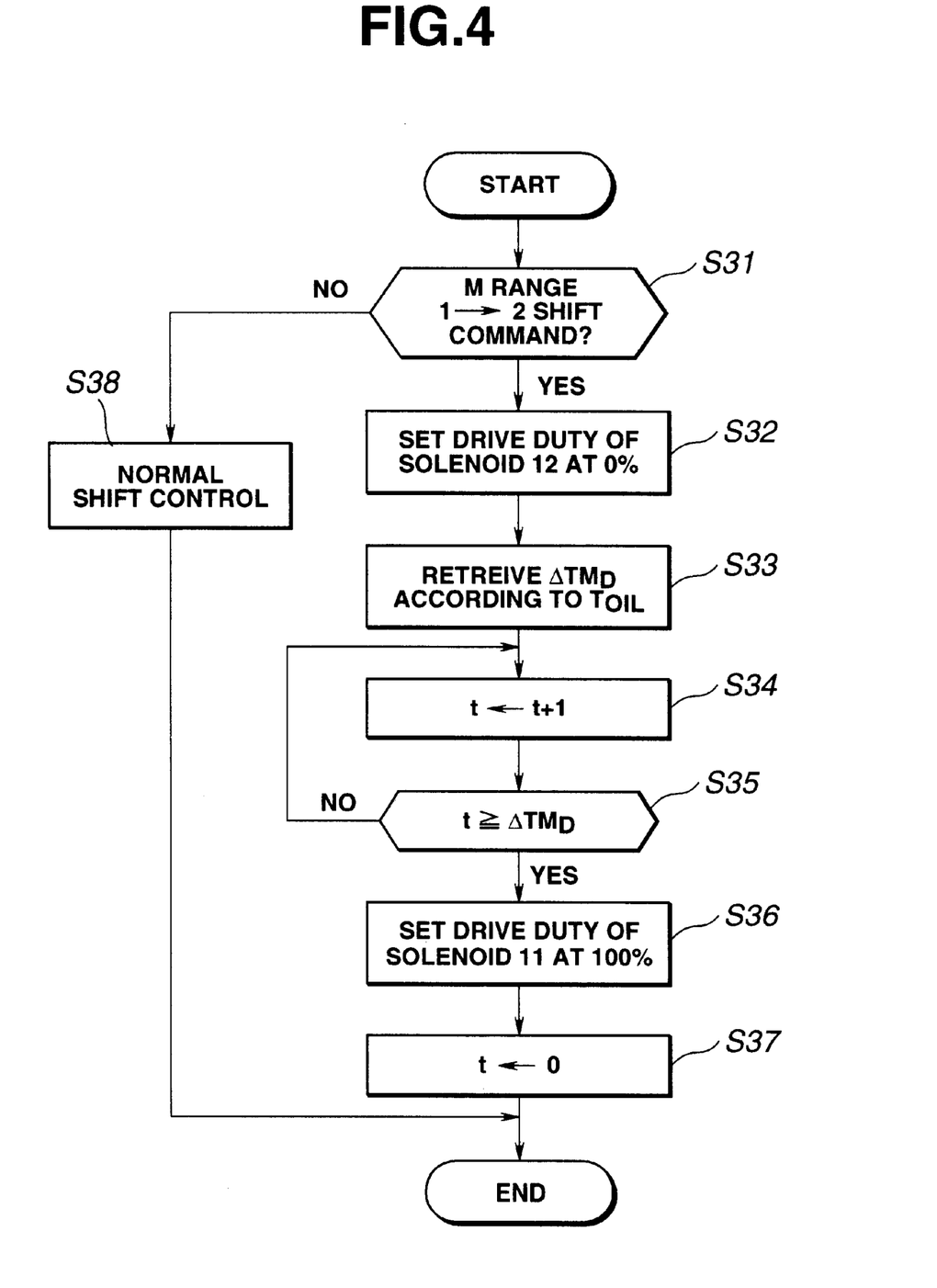
FIG. 4 is a flowchart showing a shift control program for an interlock countermeasure executed by a controller of the shift control system according to the present invention.

The controller 14 of the shift control system according to the present invention is arranged to execute a control program shown in a flowchart of FIG. 4, in order to prevent the interlock due to the low-temperature.

At a step S31, the controller 14 decides whether the 1→2 shift command in the M-range for preventing the interlock is generated or not. When the decision at the step S31 is affirmative, the routine proceeds to a step S32. When the decision at the step S31 is negative, the routine proceeds to a step S38.

At the step S32, the controller 14 sets the drive duty of the duty solenoid 12 at 0% to drain the hydraulic pressure $P_C$ of the low reverse brake LR/B. That is, the controller 14 outputs a command to disengage the low reverse brake LR/B.

Figures 7A, 7B:
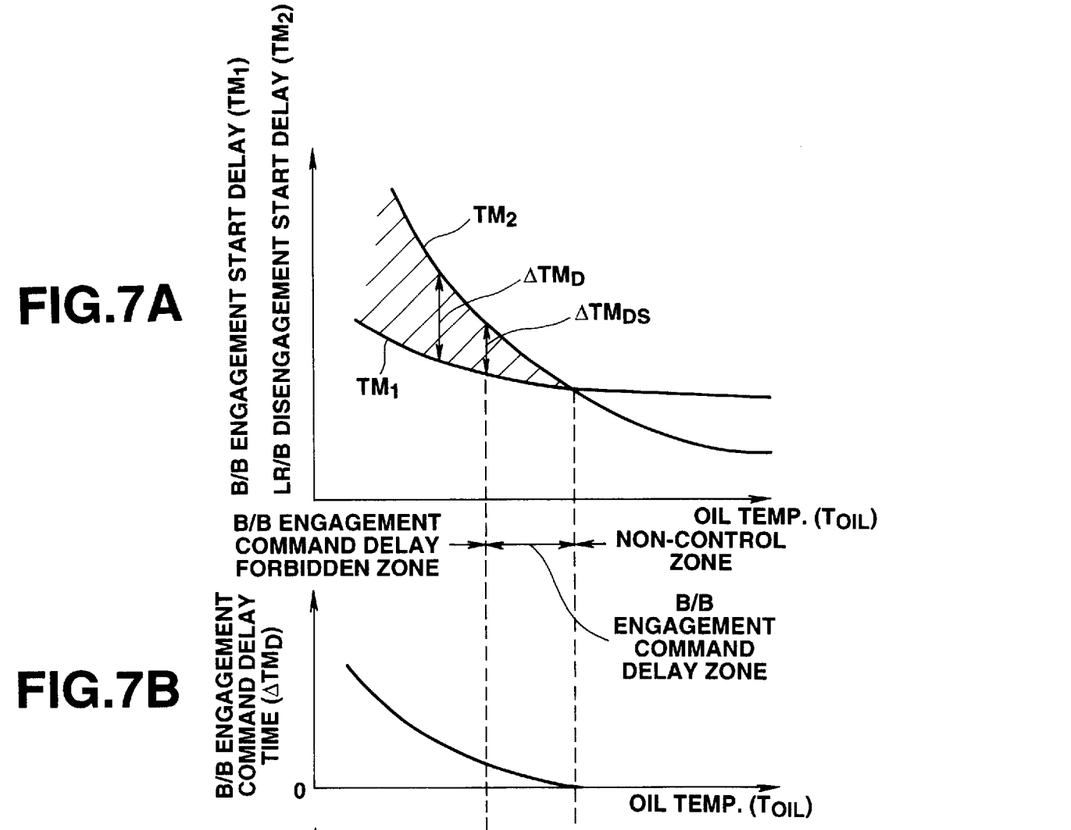
FIG. 7A is a graph showing characteristics of a disengagement start delay of a low reverse brake and an engagement start delay of a band brake with respect to an oil temperature.
FIG. 7B is a graph showing a characteristic of a band brake engagement command delay time with respect to the oil temperature.

At a step S33, the controller 14 retrieves a delay difference $\Delta TM_D$ between an engagement start delay $TM_1$ of the band brake B/B and a disengagement start delay $TM_2$ of the low reverse brake LR/B on the basis of a map shown in FIG. 7A and the transmission oil temperature $T_{OIL}$.

Figure 9:
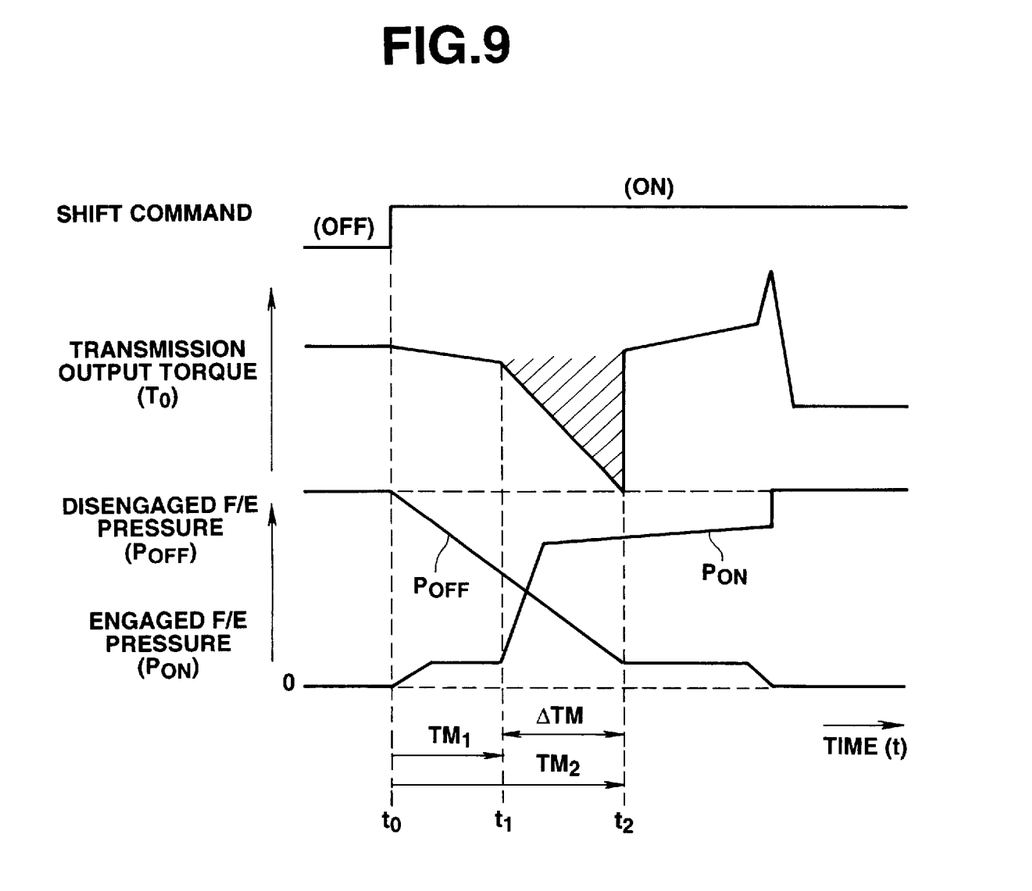
FIG. 9 is a time chart in case that the interlock is generated by the execution of the normal or conventional control under the low temperature condition.

The relationship shown in the map of FIG. 7A has been previously determined as a result of experiments. As shown in FIG. 7A, within a low-temperature crosshatching range which is smaller than a temperature $T_2$, the disengagement start delay $TM_2$ of the low reverse brake LR/B is greater than the engagement start delay $TM_1$ of the band brake B/B. Therefore, if the manual 1→2 shift is executed by a conventional manner, the both of the band brake B/B and the low reverse brake LR/B are simultaneously engaged during the delay difference $\Delta TM_D$, and the torque dragging phenomenon due to this temporal interlock is generated as shown in FIG. 9. Lower the oil temperature $T_{OIL}$ becomes, longer the delay difference $\Delta TM_D$ becomes so as to elongate the time of the torque dragging phenomenon.

The delay difference $\Delta TM_D$ obtained from the relationship shown in FIG. 7A has been previously obtained as a band brake engagement delay time $\Delta TM_D$ as shown in FIG. 7B. On the basis of the relationship shown in FIG. 7B and the transmission oil temperature $T_{OIL}$, the controller 14 retrieves the band brake engagement delay time $\Delta TM_D$.

Figure 7C:
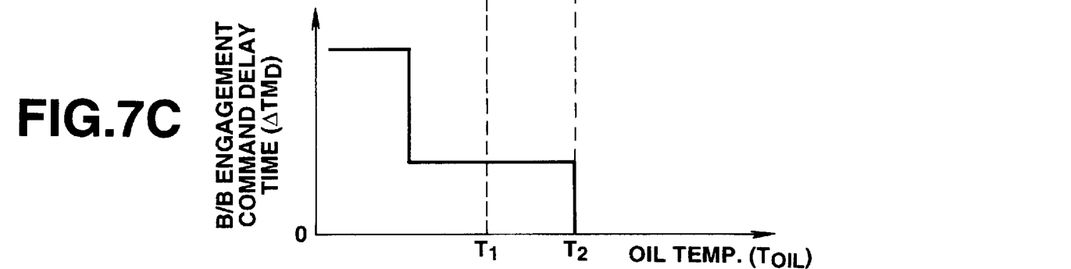
FIG. 7C is a graph showing a modified characteristic of a band brake engagement command delay time with respect to the oil temperature in another.

In case that the low-temperature interlock is prevented even when the band brake engagement delay time $\Delta TM_D$ may not be strictly determined, the band brake engagement delay time $\Delta TM_D$ may be defined stepwise as shown in FIG. 7C so as to decrease a required capacity of a memory for storing data thereof.

At a step S34, the controller 14 increments a timer t by 1 (tYt+1) to measure an elapsed time t from the outputting of the manual 1→2 shift command.

At a step S35, the controller 14 decides whether or not the elapsed time t is greater than or equal to the band brake engagement delay time $\Delta TM_D$. When the decision at the step S35 is negative, the routine returns to the step S34 to count up the elapsed time t. When the decision at the step S35 is affirmative, the routine proceeds to a step S36.

That is, by the execution of the steps S34 and S35, it is decided whether or not the elapsed time t is greater than or equal to the band brake engagement delay time $\Delta TM_D$.

At the step S36, the controller 14 sets the drive duty of the duty solenoid 11 at 100% to increase the hydraulic pressure $P_B$ of the band brake B/B. That is, the controller 14 outputs an engagement signal to the duty solenoid 11 to establish the engagement of the band brake B/B.

At a step S37, the controller 14 resets the time t (tY0). Then, this routine is terminated.

At the step S38 following to the negative decision at the step S31, the controller 14 executes a normal shift control (a conventional shift control) regardless the automatic shift mode or manual shift mode.

Figure 8:
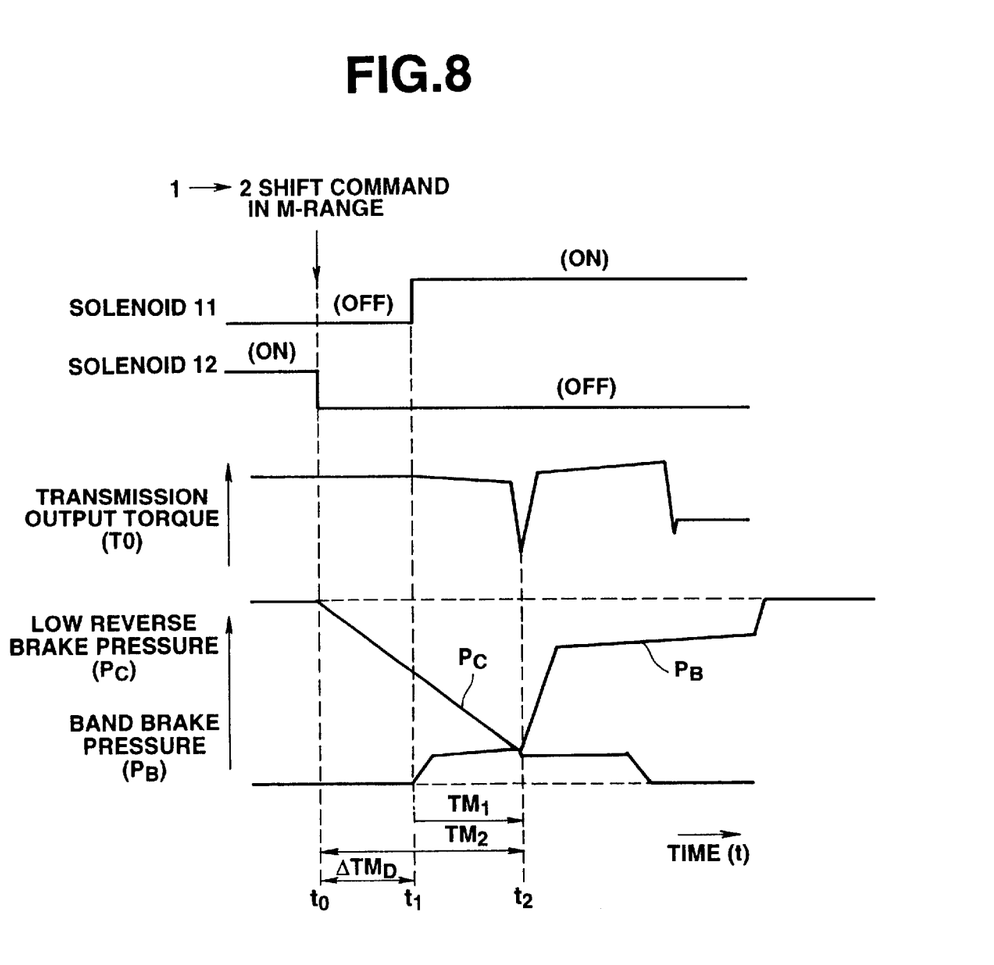
FIG. 8 is a time chart showing the time series change of the friction element oil pressure and the transmission output torque in case of the delay of the band brake engagement command.

With the thus arranged control during the manual 1→2 shift, the hydraulic pressure $P_C$ of the low reverse brake LR/B promptly starts to be decreased by switching the duty solenoid 12 from ON state to OFF state at a moment $t_0$ as shown in FIG. 8. Then, the low reverse brake LR/B starts to be disengaged at a moment $t_2$ when the disengagement delay time $TM_2$ of the low reverse brake LR/B elapsed, as shown in FIG. 8. Further, at the moment $t_2$ when the band brake engagement delay time $\Delta TM_D$ elapsed from the moment $t_0$, the duty solenoid 11 is turned ON and therefore the hydraulic pressure $P_B$ of the band brake B/B starts to be increased, and at the moment $t_2$ the band brake B/B starts to be engaged.

As shown in FIG. 7A, the band brake engagement delay time $\Delta TM_D$ is a difference between the disengagement start delay $TM_2$ of the low reverse brake LR/B and the engagement start delay $TM_1$ of the band brake B/B. Accordingly, even if the temperature of the transmission oil $T_{OIL}$ is smaller than the temperature $T_2$ shown in FIGS. 7A to 7C, the disengagement of the low reverse brake LR/B and the engagement of the band brake B/B are simultaneously started at the moment $t_2$ by the arrangement according to the present invention. This cancels the period that both of the band brake B/B and the low reverse brake LR/B are engaged and prevents the generation of the interlock.

Accordingly, the arrangement according to the present invention firmly prevents the generation of the torque dragging caused by the interlock during the manual 1→2 shift under the low temperature condition, as shown in FIG. 8. This improves the quality of the operational performance of the automatic transmission and therefore improving the value as a product.

As is clear from the engagement pattern table of FIG. 2, the shift executed by exchanging the engagement of the friction elements includes the manual and automatic 2→3 shifts executed by disengaging the band brake B/B and engaging the high clutch H/C and the manual and automatic 3→4 shifts executed by engaging the band brake B/B and disengaging the forward clutch F/C, in addition to the manual 1→2 shift. Therefore, it will be understood that the arrangement for preventing the interlock under a low temperature condition may be applied to the 2→3 shift and the 3→4 shift in addition to the manual 1→2 shift.

Actually, since the change of gear ratio of the 2→3 shift and of the 3→4shift is small as compared with that of the manual 1→2 shift, the torque dragging due to the interlock thereof is small. Therefore, there is no problem to cancel the countermeasure to the interlock during the 2→3 shift and the 3→4 shift.

Since the driver outputs the shift command of a manual shift through an operation of the shift lever 15, the driver senses a shift delay between the operation of the shift lever 15 and the actual shift executed by the automatic transmission 3. Therefore, the driver actually feels the response delay caused by an engagement delaying operation of the band brake B/B executed for preventing the interlock. That is, in case of the extremely low temperature condition where the oil temperature $T_{OIL}$ is smaller than the preset oil temperature $T_1$ in FIG. 7A, the driver feels the shift response delay by the engagement delay time greater than $\Delta TM_D$ S as an unacceptable shift delay in the manual shift. Therefore, it is preferable to execute another control if the oil temperature $T_{OIL}$ ranges in the extremely low-temperature zone.

Figure 5:
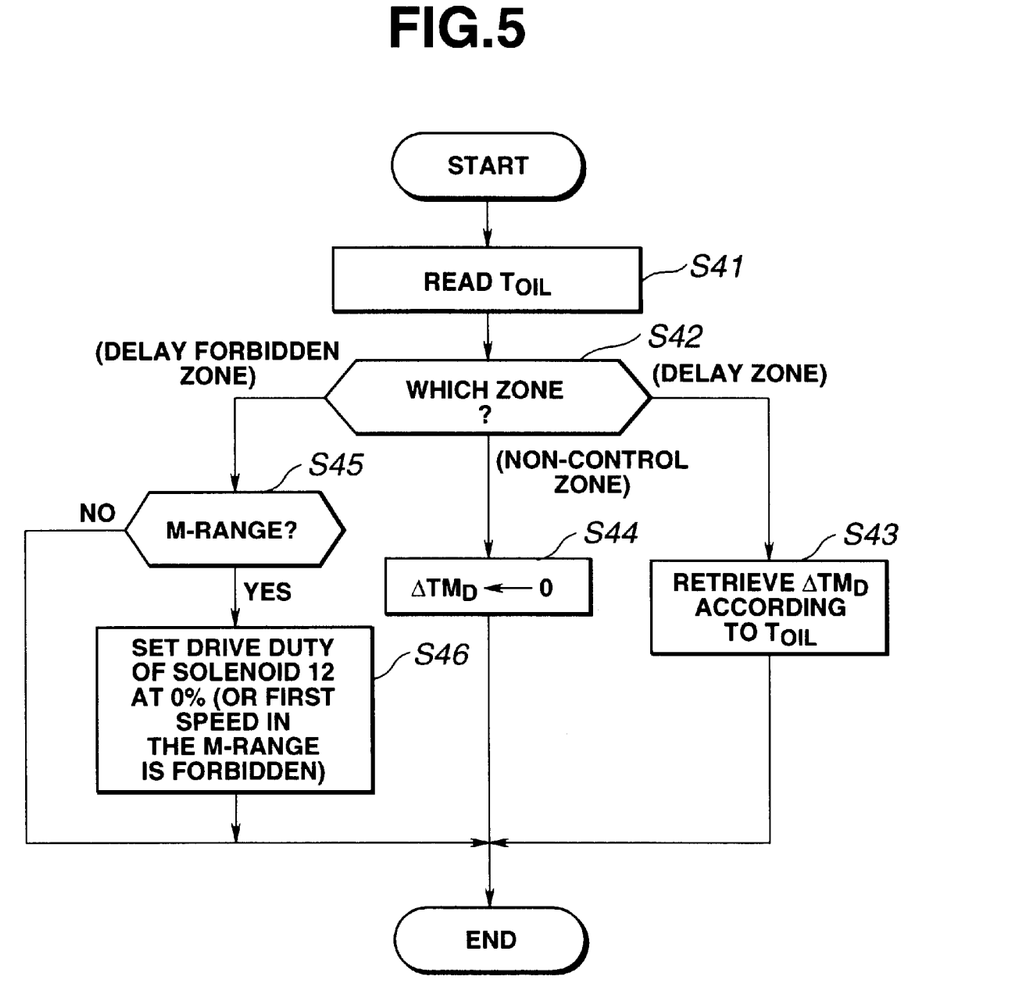
FIG. 5 is a flowchart showing a zone decision program for preventing an interlock under an extremely low temperature condition of the embodiment of the shift control system according to the present invention.
Figure 6:
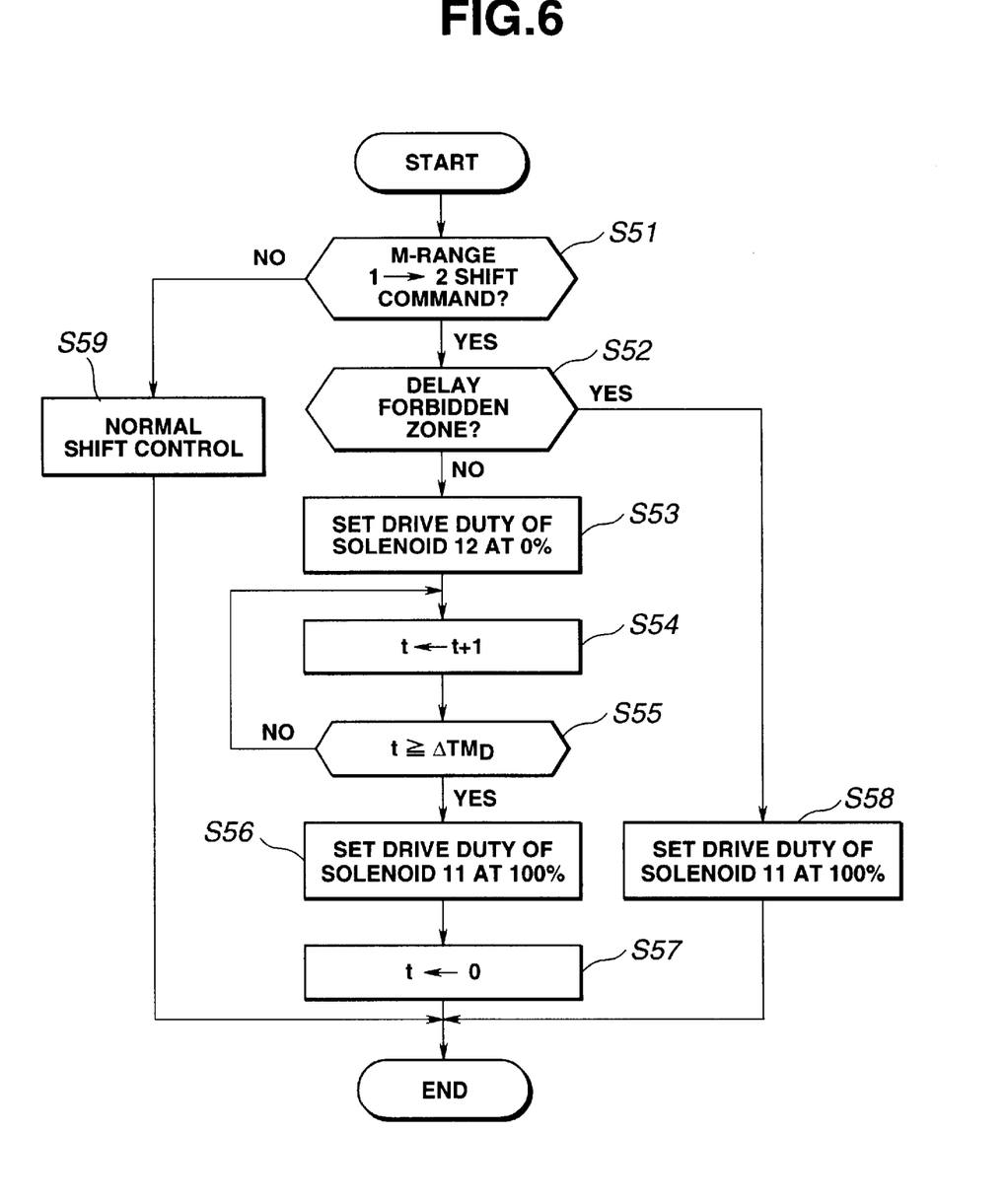
FIG. 6 is a flowchart showing a modified shift control program for preventing an interlock under the extremely low temperature condition of the embodiment of the shift control system according to the present invention.

FIGS. 5 and 6 show control programs for the above-mentioned another control for preventing the interlock under the extremely low-temperature condition. A flowchart of FIG. 5 shows a zone deciding process, and a flowchart of FIG. 6 shows a shift control based on the decision result in FIG. 5.

At a step S41, the controller 14 reads the transmission oil temperature $T_{OIL}$ from the oil temperature sensor 19.

At a step S42, the controller 14 decides whether the oil temperature $T_{OIL}$ is in a band brake engagement delay zone between $T_1$ and $T_2$, a non-controlled zone where the oil temperature $T_{OIL}$ is greater than $T_2$ or a delay forbidden zone where the oil temperature $T_{OIL}$ is smaller than Tl, on the basis of the oil temperature $T_{OIL}$ and a map corresponding to a graph of FIG. 7A. When the controller 14 decides that the oil temperature $T_{OIL}$ is in the band brake engagement delay zone, the routine proceeds to a step S43. When the controller 14 decides that the oil temperature $T_{OIL}$ is in the non-controlled zone, the routine proceeds to a step S44. When the controller 14 decides that the oil temperature is in the delay forbidden zone, the routine proceeds to a step S45.

At the step S43, the controller 14 retrieves the band brake engagement delay time $\Delta TM_D$ on the basis of the map corresponding to the graph of FIG. 7B and the oil temperature $T_{OIL}$.

At the step S44, the controller 14 sets the band brake engagement delay time $\Delta TM_D$ at zero ($\Delta TM_D Y0$).

At the step S45, the controller 14 decides whether the position of the shift lever 15 is set in the manual shift mode (M-range) or not. When the decision at the step S45 is affirmative, the routine proceeds to a step S46. When the decision at the step S45 is negative, the routine is terminated.

At the step S46, the controller 14 sets the drive duty of the duty solenoid 12 at 0% to keep the low reverse brake LR/B at the disengaged state, so that the engine brake of the first-speed in the M-range can not be used. That is, the engine break of the first-speed in the M-range is forbidden by practically forbidding the engagement of the low reverse clutch LR/C, or by arranging the controller 14 so as not to command the M-range first-speed even if the driver manually commands a downshift to the first-speed through the shift lever 15 in the M-range.

After the execution of each of the steps S43, S44 and S46, the routine is terminated.

Next, the flowchart of FIG. 6 is executed on the basis of the result of the flowchart of FIG. 5.

At a step S51, the controller 14 decides whether the 1→2 shift command in the M-range is generated or not. When the decision at the step S51 is affirmative, the routine proceeds to a step S52. When the decision at the step S51 is negative, the routine proceeds to a step S59.

At the step S52, the controller 14 decides whether the oil temperature $T_{OIL}$ is in the delay forbidden zone or not, on the basis of the result of the process shown in FIG. 5. When the decision at the step S52 is negative, that is, when the oil temperature $T_{OIL}$ is in the band brake engagement delay zone or the non-controlled zone, the routine proceeds to a step S53. When the decision at the step S52 is affirmative, the routine proceeds to a step S58.

At the step S53, the controller 14 sets the duty ratio of the duty solenoid 12 at 0% to drain the hydraulic pressure $P_C$ of the low reverse brake LR/B. That is, the controller 14 promptly outputs a command for disengaging the low reverse brake LR/B.

At a step S54, the controller 14 increments a timer t by 1 (tYt+1) to measure an elapsed time t from the manual 1→2 shift command.

At a step S55, the controller 14 decides whether or not the elapsed time t is greater than or equal to the band brake engagement delay time $\Delta TM_D$. When the decision at the step S55 is negative, the routine returns to the step S54 to count up the elapsed time t. When the decision at the step S55 is affirmative, the routine proceeds to a step S56. That is, by the execution of the steps S54 and S55, it is decided whether or not the elapsed time t is greater than or equal to the band brake engagement delay time $\Delta TM_D$.

At the step S56, the controller 14 sets the drive duty of the duty solenoid 11 at 100% to increase the hydraulic pressure $P_B$ of the band brake B/B. That is, the controller 14 outputs a command for engaging the band brake B/B.

At a step S57, the controller 14 resets the i* time t (tY0). Then, this routine is terminated.

At the step S58 following to the affirmative decision at the step S52, the controller 14 sets the drive duty of the duty solenoid 11 at 100% to increase the hydraulic pressure $P_B$ of the band brake B/B.

At the step S59 following to the negative decision at the step S51, the controller 14 executes a normal shift control regardless the automatic shift mode or manual shift mode (M-range).

With the thus arranged control during the manual 1→2 shift in case that it is decided that the oil temperature $T_{OIL}$ is in the delay zone, the hydraulic pressure PC of the low reverse brake LR/B promptly starts to be decreased by switching the duty solenoid 12 from ON state to OFF state at a moment $t_0$ as shown in FIG. 8. Then, the low reverse brake LR/B starts to be disengaged at a moment $t_2$ when the disengagement delay time $TM_2$ of the low reverse brake LR/B elapsed, as shown in FIG. 8. Further, at the moment ti when the band brake engagement delay time $\Delta TM_D$ elapsed from the moment to, the duty solenoid 11 is turned ON so that the hydraulic pressure $P_B$ of the band brake B/B starts to be increased, and at the moment $t_2$ the band brake B/B starts to be engaged.

As shown in FIG. 7A, the band brake engagement delay time $\Delta TM_D$ is the difference between the disengagement start delay $TM_2$ of the low reverse brake LR/B and the engagement start delay $TM_1$ of the band brake B/B. Accordingly, in the low temperature zone between $T_1$ and $T_2$ shown in FIGS. 7A to 7C, the disengagement of the low reverse brake LR/B and the engagement of the band brake B/B are simultaneously started at the moment $t_2$ by the arrangement according to the present invention. This cancels the period that both of the band brake B/B and the low reverse brake LR/B are engaged and prevents the generation of the interlock.

Accordingly, the arrangement according to the present invention firmly prevents the generation of the torque dragging in the low-temperature manual 1→2 shift, as shown in FIG. 8. This improves the quality of the operational performance of the automatic transmission and thereby improving the value as a product.

Furthermore, within the delay forbidden zone of the band brake engagement and in case of the M-range, the low reverse brake LR/B has been kept at an disengaged state by setting the duty ratio of the duty solenoid 12 at 0% by the execution of the step S46. Therefore, the manual 1→2 shift is achieved only by the engagement of the band brake B/B as is clear from FIG. 2. This prevents the interlock under the low temperature condition. Accordingly, even in the extremely low temperature condition where the oil temperature $T_{OIL}$ becomes smaller than $T_1$ of FIG. 7, the generation of the torque dragging due to the interlock during the manual 1→2 shift is prevented.

Therefore, the interlock countermeasure in the extremely low temperature condition in accordance with the present invention is executed by keeping the low reverse brake LR/B at the disengaged state in the M-range. Although this interlock countermeasure invites the ineffectiveness of the engine brake in M-range, all of first to fourth speed are selected in the M-range. That is, without the demerit as to the selection of the gear ratio, the interlock countermeasure can be executed. Further, this invites a special effect. That is, if under the extremely low temperature the delay of the engagement command of the band brake B/B is executed as an interlock countermeasure as same as that in the low temperature condition, the delay time $\Delta TM_D$ of the band brake engagement command becomes long significantly. This elongation of the delay time $\Delta TM_D$ elongates a shift response delay between the generation of the manual shift command and the start of the 1→2 shift so as to impress a strange feeling to a driver as a manual shift. In contrast, according to the countermeasure to keep the low reverse brake LR/B in the disengaged state, the interlock under the extremely low temperature condition is prevented without applying the strange feeling to the driver.

Since the driver does not generate the shift command during the automatic shift mode, the driver does not feel strange feeling during the automatic shift mode. In the extremely low temperature condition (band brake engagement command delay forbidden zone) that the oil temperature $T_{OIL}$ is smaller than $T_1$, another countermeasure may be executed such that the controller 14 does not command the M-range first-speed even if the driver manually commands a downshift to the first speed through the shift lever 15 in the M-range, as mentioned in the step S46 of FIG. 5. This countermeasure also prevents an interlock under the extremely low temperature condition without applying the strange feeling to the driver. In this case, although the engine brake of the first speed in the M-range can not be used, the other gear ratios in the M-range are maintained. Therefore, the interlock countermeasure under the extremely low temperature can be achieved by practically forbidding to select the first-speed.

The entire contents of Japanese Patent Application No. 10-73897 filed on Mar. 23, 1998 in Japan are incorporated herein by reference.

Although the invention has been described above by reference to certain embodiments of the invention, the invention is not limited to the embodiments described above. Modifications and variations of the embodiments described above will occur to those skilled in the art, in light of the above teaching.

What is claimed is:

1. A shift control system of an automatic transmission executing a shift from a first speed position to a second speed position, the automatic transmission having an automatic shift mode and a manual shift mode, the shift control system comprising:

a first friction element engaged so as to put engine brake active when the first speed position is selected in the manual shift mode, the first friction element being engaged by a pressure of hydraulic oil;

a one-way clutch engaged when the first position is selected in the automatic shift mode;

a second friction element engaged when the second speed position is selected in one of the manual shift mode and the automatic shift mode, the second friction element being engaged by a pressure of hydraulic oil;

a first solenoid varying the pressure of hydraulic oil applied to the first friction element according to a first signal;

a second solenoid varying the pressure of the hydraulic oil applied to the second friction element according to a second signal;

a controller outputting the first signal to said first solenoid to decrease the pressure of hydraulic oil and outputting the second signal to said second solenoid to engage the second friction element when the shift from the first shift position to the second shift position is executed in the manual shift mode; and an oil temperature sensor detecting a temperature of the hydraulic oil and outputting a temperature signal indicative of the temperature of the hydraulic oil;

wherein said controller delaying the output of the second signal as compared with the output of the first signal when the temperature signal from said oil temperature sensor is lower than a predetermined temperature.

2. A shift control system of an automatic transmission executing a shift from a first speed position to a second speed position, the automatic transmission having an automatic shift mode and a manual shift mode, the shift control system comprising:

a first friction element engaged so as to put engine brake active when the first speed position is selected by the manual shift mode, said first friction element being engaged by a pressure of hydraulic oil;

a one-way clutch engaged when the first speed position is selected in the automatic shift mode;

a second friction element engaged when the second speed position is selected in one of the manual shift mode and the automatic shift mode, said second friction element being engaged by a pressure of hydraulic oil;

a first pressure varying means for varying a pressure applied to the first friction element;

a second pressure varying means for varying a pressure applied to the second friction element; and a control means for executing the shift by outputting a pressure decreasing signal to said first pressure varying means so as to disengage the first friction element when the first friction element is engaged and by outputting a pressure increasing signal to said second pressure varying means so as to disengage the second friction element, said controlling means delaying the output of the pressure increasing signal as compared with the output of the pressure decreasing signal when a temperature of hydraulic oil is lower than a predetermined temperature.

3. A shift control system as claimed in claim 1, wherein the predetermined temperature is a temperature at which a temporal interlock of the automatic transmission during the shift is caused by the delay of draining the hydraulic oil from the first friction element to be disengaged relative to supplying the hydraulic oil to the second friction element to be engaged.

4. A shift control system as claimed in claim 1, wherein a delay time of the output of the second signal the output of the first signal is increased according to a lowering of the oil temperature.

5. A shift control system as claimed in claim 3, wherein in case that the shift is a manual 1→2 upshift, the first friction element is a first-speed selecting friction element and the first friction element is an engine brake friction element, said controller forbidding the engagement of the engine brake friction element in a manual first-speed gear ratio instead of delaying the output of the second signal when the oil temperature is lower than a low temperature where the delay time is greater than a predetermined time.

6. A shift control system as claimed in claim 3, wherein in case that the shift is a manual 1→2 upshift, the first friction element is a first-speed selecting friction element and the first friction element is an engine brake friction element, said controller forbidding to manually select a first-speed gear ratio instead of delaying the output of the second signal when the oil temperature is lower than a predetermined low temperature where the delay time is greater than a predetermined time.

7. A shift control system as claimed in claim 6, wherein said controller is arranged to be able to manually select one of gear ratios except for the first-speed gear ratio instead of delaying the output of the first signal when the oil temperature is lower than the predetermined low temperature.

8. A shift control system as claimed in claim 1, wherein the first signal is a duty ratio signal indicative that a drive duty of said first solenoid is set at 0%, and the second signal is a duty ratio signal indicative that a drive duty of said second solenoid is set at 100%.

9. A shift control system as claimed in claim 1, wherein said controller includes a map indicative of a relationship between the oil temperature and a delay time.

10. A shift control system as claimed in claim 1, wherein said controller selectively controls engagement and disengagement of a forward clutch, a high clutch, a band brake, a low reverse brake, a low one-way clutch and a reverse clutch, the first friction element being the low reverse brake and the second friction element being the band brake when a manual 1→2 upshift is executed.

* * * * *